UNITED STATES PATENT OFFICE.

NAKABA ITO, OF TOKYO FU, JAPAN.

HEAT-INSULATING COMPOUND.

1,245,723.     Specification of Letters Patent.     Patented Nov. 6, 1917.

No Drawing.     Application filed July 14, 1917. Serial No. 180,602.

*To all whom it may concern:*

Be it known that I, NAKABA ITO, subject of Japan, residing at No. 768, Ikebukuro, Sugamo Mura, Kita Toshima Gun, Tokyo Fu, Japan, have invented new and useful Improvements in Heat-Insulating Compounds, of which the following is a specification.

This invention relates to a heat insulating compound which is manufactured by adding to a mixture of kieselguhr, fibrous asbestos, carbonate of magnesium, and calcium sulfate an aqueous solution of a bicarbonate salt, and kneading and allowing the mixture to solidify. The object of this invention is to obtain a substance which is porous and light, and is an efficient non-conductor of heat.

When kieselguhr, asbestos, and the like are solidified by mixing the same with anhydrous calcium sulfate, the substance obtained becomes a compact and heavy mass, and consequently the heat insulating property of the kieselguhr, asbestos and other ingredients is greatly impaired. My invention is an improvement on such substance, and consists in adding to the above ingredients a bicarbonate salt, and kneading the mixture carefully, thus causing the bicarbonate salt to mix evenly with the other ingredients. Then the bicarbonate salt will be decomposed by the calcium sulfate and evolve carbon dioxid very slowly while the mixture is solidifying, and thus a porous substance will be obtained.

The following is an example of carrying my invention into effect:—

First form calcium carbonate by passing carbon dioxid into a solution of calcium hydrate, and then turn it into soluble calcium bicarbonate. To 100 parts of this solution of calcium bicarbonate add from 4 to 7 parts of sodium bicarbonate. Add the fluid thus prepared to a mixture of 50 parts of kieselguhr, 20 parts of fibrous asbestos, 40 parts of carbonate of magnesium and 40 parts of anhydrous calcium sulfate, and carefully knead the whole. The paste thus formed may be solidified in a mold into any required shape, or may be applied directly to boilers, steam-pipes, or the like to form heat-insulating layer thereon. A small percentage of calcium hydrate may be admitted into the compound.

In this invention the principal heat-insulating material is the kieselguhr, while the asbestos principally serves as binding medium. The calcium bicarbonate, before the mass completely solidifies and while the moisture is evaporating, decomposes and evolves carbon dioxid slowly which causes innumerable pores to form in the mass. The sodium bicarbonate prevents the decomposition of the calcium bicarbonate taking place before kneading. At the same time it will be decomposed by the liquid sodium sulfate and evolve carbon dioxid, and also produce sodium sulfate, as shown in the following formula. This sodium sulfate promoting the solubility of calcium sulfate, a suitable quantity thereof is constantly dissolved in water and evolves carbon dioxid, thus making the substance porous:—

$$CaSO_4 + 2NaHCO_3 = CaCO_3 + Na_2SO_4 + CO_2 + H_2O$$

In summing up, the main feature of this invention is mixture of kieselguhr and fibrous substance such as asbestos with a bicarbonate salt and calcium sulfate; for 1. If fibrous substance is wanting, the mass when kneaded by adding water thereto, will become a very soft paste, and a great difficulty will be experienced in applying it to boilers, pipes and the like. Moreover, it has propensity to become brittle when solidified.

2. The bicarbonate salt and calcium sulfate act to generate carbon dioxid very slowly which makes the substance very porous. Moreover, the calcium sulfate prevents the substance from becoming soft paste, and at the same time removes the fear of the substance becoming cracked when solidified or of leaving, when applied to boilers, pipes and the like, vacant spaces between their surfaces and the coating.

The substance of my invention is porous and light, and is an efficient heat insulator. It is, therefore, a fit substance to be used with boilers, steam pipes, brine pipes of refrigerators and the like to prevent radiation of heat or its introduction into them.

Having thus described my invention, what

I claim and desire to be protected by Letters Patent is:—

1. A heat-insulating substance characterized by the addition of calcium sulfate and a bicarbonate salt to a mixture of kieselguhr and fibrous substance, for the purpose hereinbefore set forth.

2. A heat-insulating substance manufactured by addition of an aqueous solution of calcium bicarbonate and sodium bicarbonate to a mixture of kieselguhr, asbestos, carbonate of magnesium and calcium sulfate, for the purposes hereinbefore set forth.

In testimony whereof I have signed my name to this specification in the presence of two subscribing witnesses.

NAKABA ITO.

Witnesses:
YOSHIKA IKEDA,
K. ITO.

Copies of this patent may be obtained for five cents each, by addressing the "Commissioner of Patents, Washington, D. C."